(12) United States Patent
Lim et al.

(10) Patent No.: US 7,448,581 B2
(45) Date of Patent: Nov. 11, 2008

(54) DISPLAY APPARATUS

(75) Inventors: Jeong-su Lim, Suwon-si (KR); Tae-sung Kim, Yongin-si (KR); Tae-jin Kim, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 2 days.

(21) Appl. No.: 11/364,408

(22) Filed: Mar. 1, 2006

(65) Prior Publication Data
US 2006/0231695 A1   Oct. 19, 2006

(30) Foreign Application Priority Data
Mar. 15, 2005   (KR) .................... 10-2005-0021276

(51) Int. Cl.
*F16M 11/04*   (2006.01)
(52) U.S. Cl. .................... 248/176.3; 248/919; 361/681
(58) Field of Classification Search .................. 248/121, 248/122.1, 176.3, 371, 919–923; 361/681, 361/682; D14/374, 375; 40/748
See application file for complete search history.

(56) References Cited

U.S. PATENT DOCUMENTS

| | | | | |
|---|---|---|---|---|
| 348,706 | A * | 9/1886 | Weiner | 108/115 |
| 630,231 | A * | 8/1899 | Hudgin | 248/460 |
| 5,255,214 | A * | 10/1993 | Ma | 361/680 |
| 5,383,138 | A * | 1/1995 | Motoyama et al. | 361/683 |
| 5,812,368 | A * | 9/1998 | Chen et al. | 361/681 |
| 6,031,714 | A * | 2/2000 | Ma | 361/681 |
| 6,076,787 | A * | 6/2000 | Troyer | 248/166 |
| 6,233,138 | B1 * | 5/2001 | Osgood | 361/681 |
| 6,430,038 | B1 * | 8/2002 | Helot et al. | 361/681 |
| 7,177,144 | B2 * | 2/2007 | Ha et al. | 361/681 |
| 2004/0012917 | A1 * | 1/2004 | Jung et al. | 361/681 |
| 2004/0057197 | A1 * | 3/2004 | Hill et al. | 361/683 |
| 2005/0002159 | A1 * | 1/2005 | Jeong | 361/683 |
| 2005/0247832 | A1 * | 11/2005 | Cho et al. | 248/133 |

FOREIGN PATENT DOCUMENTS

| | | |
|---|---|---|
| CN | 1580882 | 2/2005 |
| KR | 2002-0027798 | 4/2002 |
| KR | 20-0305308 | 3/2003 |
| KR | 2003-0067850 | 8/2003 |
| KR | 2004-0028113 | 4/2004 |
| KR | 2004-0032278 | 4/2004 |
| KR | 200410069908 | 2/2005 |

* cited by examiner

*Primary Examiner*—Korie H. Chan
(74) *Attorney, Agent, or Firm*—Roylance, Abrams, Berdo & Goodman, L.L.P.

(57) ABSTRACT

The prevent invention relates to a display apparatus having a display main body adapted to display a picture, a base part adapted to be mounted on an installation surface and supporting the display main body, and a stand part disposed between the base part and the display main body. A first hinge part is disposed between the display main body and the stand part to fold the stand part onto a rear of the display main body. A second hinge part is disposed between the stand part and the base part to rotate the base part between a supporting position where the base part is mounted in a substantially transverse direction with respect to the display main body and a folding position where the base part is mounted substantially parallel to a first end of the stand part. A locking assembly prevents and allows the base part from being and to be rotated between the supporting position and the folding position.

14 Claims, 10 Drawing Sheets

DISPLAY APPARATUS

CROSS-REFERENCE TO RELATED APPLICATIONS

This application claims the benefit under 35 U.S.C. § 119(a) of Korean Patent Application No. 2005-0021276, entitled "Display Apparatus," filed on Mar. 15, 2005, the entire disclosure of which is hereby incorporated by reference.

BACKGROUND OF THE INVENTION

1. Field of the Invention

The present invention relates to a display apparatus. More particularly, the present invention relates to a display apparatus having an improved base part supporting a display main body and a coupling structure of a stand part and the base part.

2. Description of the Related Art

Generally, a display apparatus refers to monitors for devices, such as televisions or computers, that display a picture employing a cathode ray tube (CRT), a liquid crystal display (LCD), a plasma display panel (PDP) or a similar display apparatus.

For example, an LCD monitor includes a display main body displaying the picture through an LCD panel, a base part supporting the display main body, and a stand part provided between the display main body and the base part.

When the LCD monitor is packed for transferring or shipping, a packing volume thereof increases in the assembled state when the stand part is coupled to the display main body and to the base part. To solve the above problem, an LCD monitor has a base part detachable from the stand part (for example, see Korean Utility Model No. 316585), thereby reducing the packing volume during transfer. For reference, the display main body, the base part and the stand part respectively are identified as a monitor, a stand base and a stand post in the LCD monitor of Korean Utility Model No. 316585.

The conventional LCD monitor includes the stand base, the stand post coupled to the stand base, and a monitor supported by the stand post. The stand post and the stand base are detachable from each other and are coupled by a spring. A lower end of the spring is coupled to a pin provided in the stand base, and an upper end of the spring is coupled to a pin provided in the stand post.

In the conventional display apparatus, the stand part is provided to separate from the base part to reduce the packing volume, such that the base part may be lost. Even after the stand part couples with the base part, the stand part may become separated from the base part by external impacts.

Accordingly, a display apparatus according to exemplary embodiments of the present invention has a stand part and a base part foldable onto the display main body to reduce the packing volume without separating the base part from the stand part.

Accordingly, a need exists for an improved display apparatus having a base part and a stand part foldable onto the display main body without separating the base part and that prevents accidental separation of the base part from the stand part when subjected to external impacts.

SUMMARY OF THE INVENTION

Accordingly, exemplary embodiments of the present invention provide a display apparatus having a base part rotatable about a stand part and that supports the stand part and the display main body on an installation surface in a supporting position. The base part may be tilted, or rotated, to a folding position for transfer of the display apparatus, and the base part as well as the stand part are folded substantially parallel to a rear surface of the display main body to reduce a packing volume.

The foregoing and other objects are substantially realized by providing a display apparatus having a display main body adapted to display a picture, a base part adapted to be mounted on an installation surface and supporting the display main body, and a stand part provided between the base part and the display main body. A first hinge part is disposed between the display main body and the stand part and adapted to fold the stand part onto a rear surface of the display main body. A second hinge part is disposed between the stand part and the base part, and adapted to tilt the base part between a supporting position where the base part is mounted in a transverse direction with respect to an arranging direction of the stand part and a folding position where the base part is mounted substantially parallel to a first side of the stand part along the arranging direction of the stand part. A locking assembly prevents and allows the base part from being and to be tilted between the supporting position and the folding position.

The locking assembly may include a projection provided in one of the stand part and the base part. A coupling unit is disposed in the other one of the stand part and the base part and is adapted to couple to the projection to prevent the base part from being tilted, and to uncouple the projection to allow the base part to be tilted.

The coupling unit may include a casing part having a first side thereof adapted to couple to the stand part and a second side thereof adapted to couple to the base part. A coupling part is coupled to slide in the casing part, and is adapted to be coupled to the projection and to be uncoupled from the projection.

The coupling unit may further include a spring member having a first end thereof supporting the casing part and a second end thereof supporting the coupling part to supply an elastic force to the coupling part.

The coupling unit may further include an operating knob provided in the coupling part for sliding the coupling part.

The second hinge part may include a hinge protrusion provided in one of the stand part and the base part, and a protrusion holder provided on the other one and tiltably accommodating the hinge protrusion.

Other objects, advantages, and salient features of the invention will become apparent from the detailed description, which, taken in conjunction with the annexed drawings, discloses preferred exemplary embodiments of the invention.

BRIEF DESCRIPTION OF THE DRAWINGS

These and other aspects, features, and advantages of certain exemplary embodiments of the present invention will more apparent and more readily appreciated from the following detailed description, taken with reference to the accompanying drawings, in which.

Throughout the drawings, like reference numerals will be understood to refer to like parts, components and structures.

DETAILED DESCRIPTION OF EXEMPLARY EMBODIMENTS

The matters defined in the description, such as a detailed construction and elements thereof, are provided to assist in a comprehensive understanding of the exemplary embodiments of the present invention. Accordingly, those of ordinary skill in the art will recognize that various changes and modifications of the exemplary embodiments described herein may be made without departing from the scope and spirit of the present invention.

Figure 1:
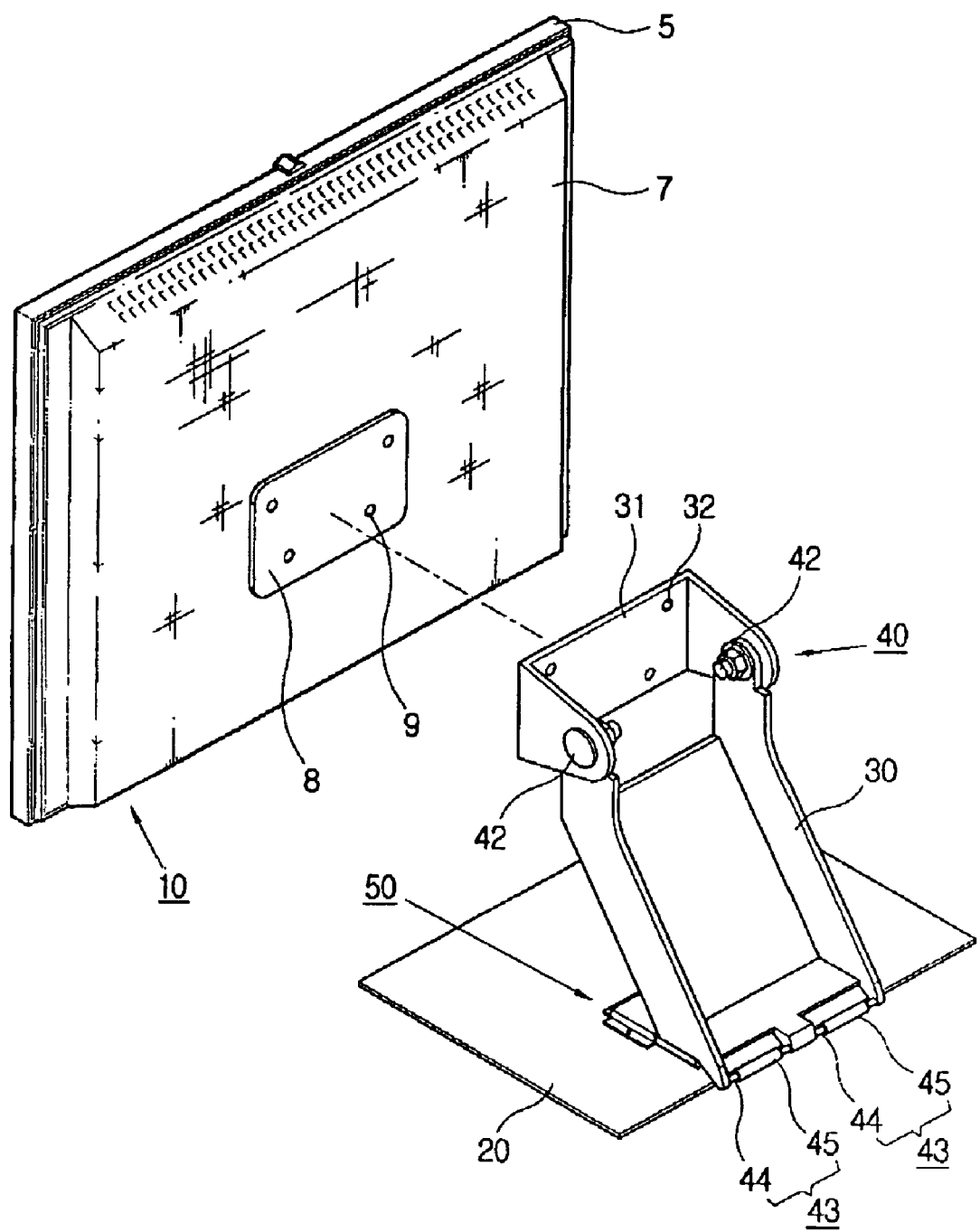
FIG. 1 is an exploded perspective view of a rear surface of a display main body of a display apparatus in accordance with an exemplary embodiment of the present invention.
Figure 2:
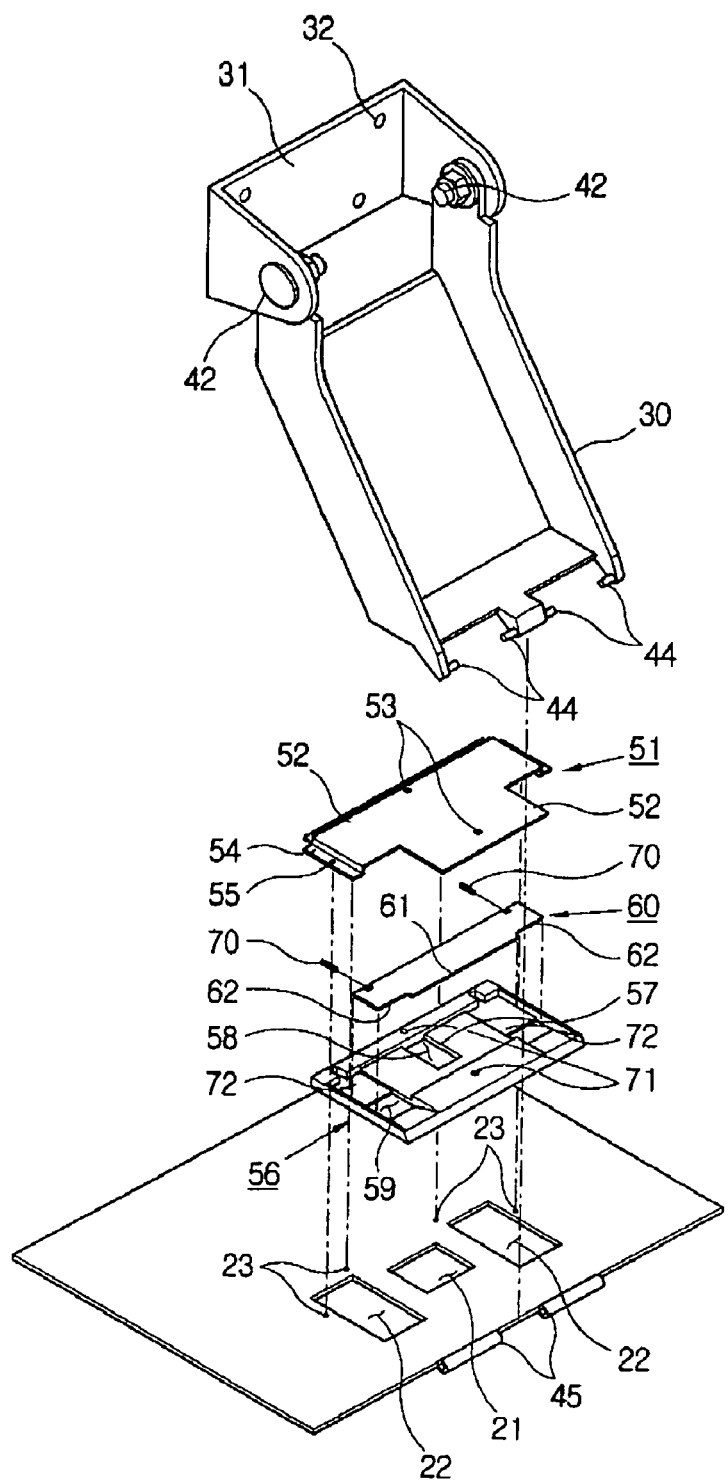
FIG. 2 is an exploded perspective view of a stand part and a base part of the display apparatus in accordance with the exemplary embodiment of the present invention.
Figure 3:
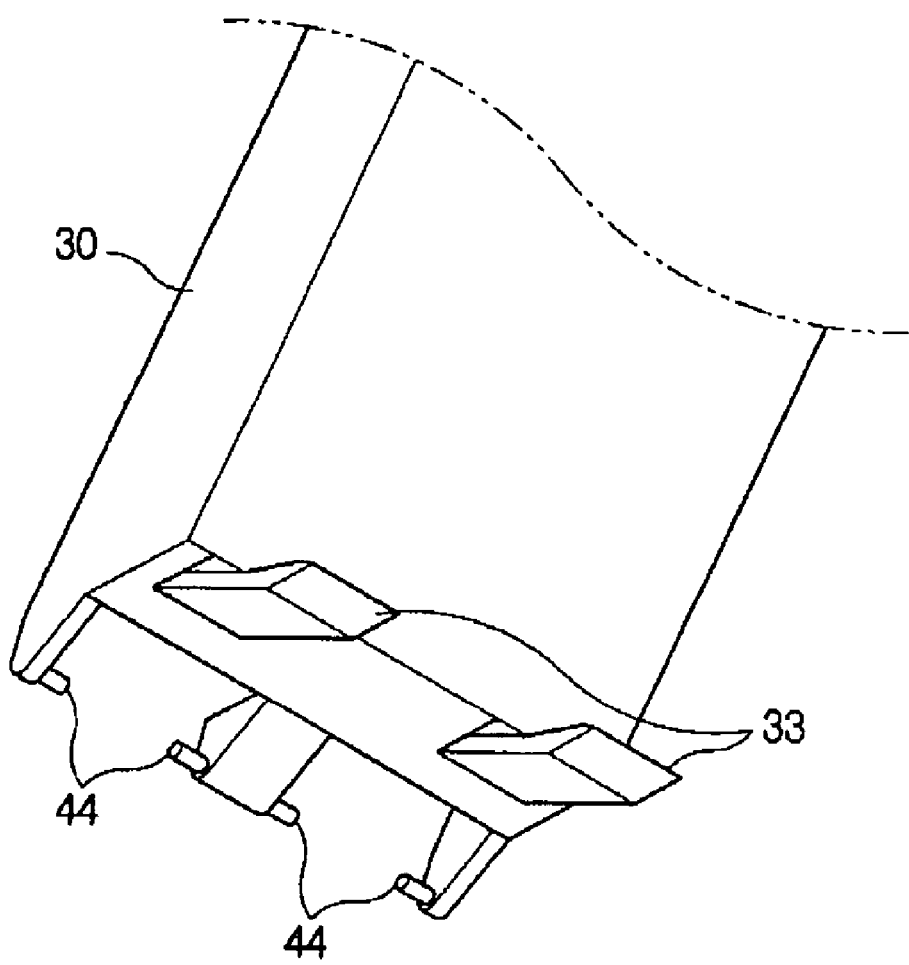
FIG. 3 is an enlarged perspective view of projections of the stand part of the display apparatus in accordance with the exemplary embodiment of the present invention.
Figure 4:
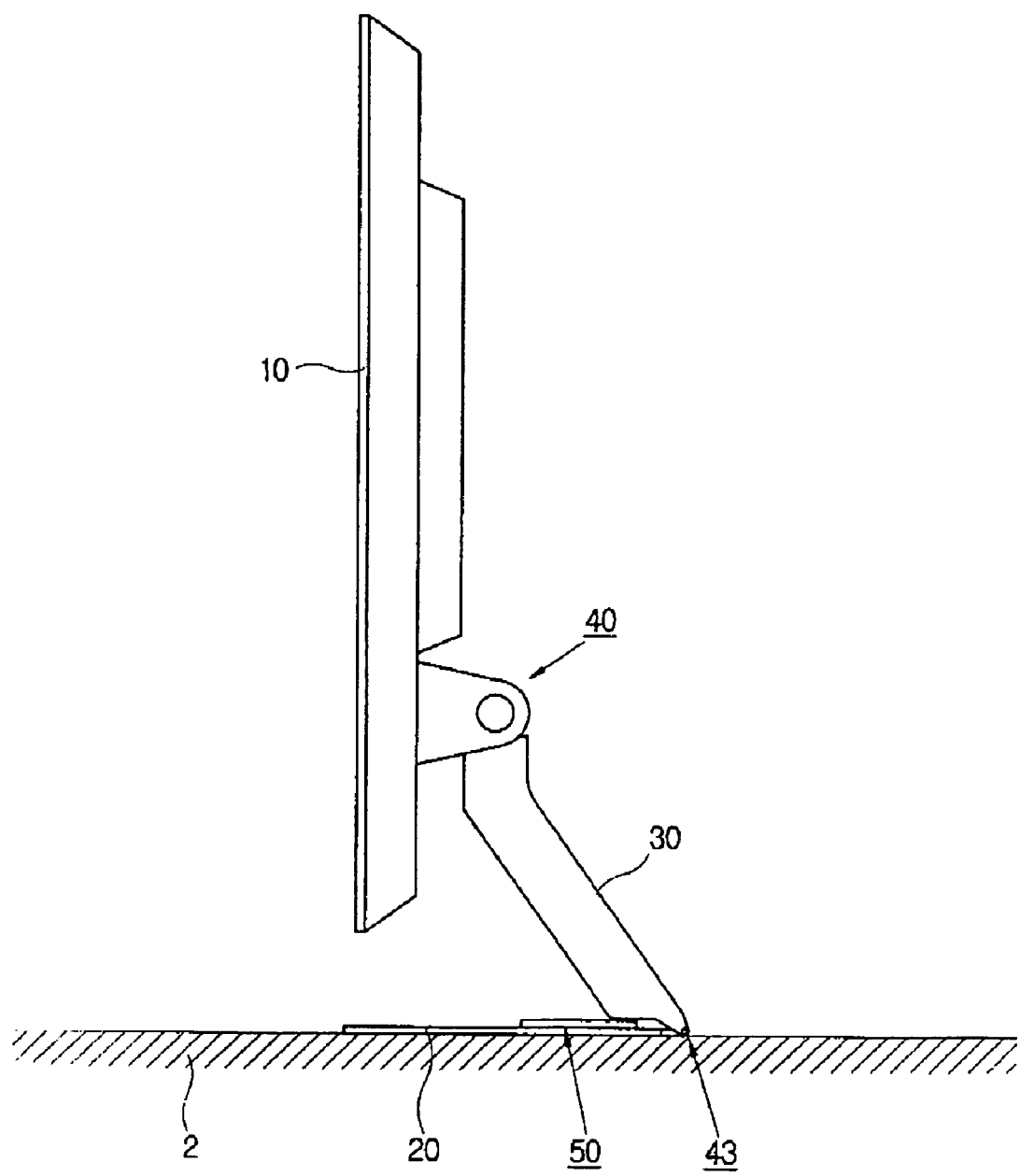
FIG. 4 is a side elevational view of a seated state of the base part on an installation surface.

As shown in FIGS. 1 and 4, a display apparatus according to an exemplary embodiment of the present invention includes a display main body 10, a base part 20 supporting the display main body 10 on an installation surface 2, and a stand part 30 provided between the display main body 10 and the base part 20. The display main body 10 is tiltably or rotatably coupled to the stand part 30 by a first hinge part 40 and the stand part 30 is tiltably or rotatably coupled to the base part 20 by a second first hinge part 43. A locking assembly disposed between the stand part 30 and the base part 20 prevents the base part 20 from being tilted and allows the base part 20 to be tilted.

The display main body 10 includes a display panel (not shown) adapted to display a picture, and front and rear casings 5 and 7 that support a display panel (not shown).

A monitor bracket 8 is connected to the rear casing 7 of the display main body 10 and the monitor bracket 8 is coupled to a supporting bracket 31 that is tiltably or rotatably coupled to the stand part 30 by the first hinge part 40.

A first end of the supporting bracket 31 is coupled to the monitor bracket 8 secured to the rear casing 7 of the display main body 10, and a second end of the supporting bracket is tiltably coupled to the stand part 30.

That is, the first end of the supporting bracket 31 is coupled to the monitor bracket 8 secured to the rear casing 7 by fasteners, such as screws (not shown), which are fastened to monitor fastening holes 9 of the monitor bracket 8 through inserting holes 32 formed in the first end of the supporting bracket 31. The second side thereof is tiltably coupled to the stand part 30 by a first hinge part 40. Therefore, a user may tilt the display main body 10 about an axis of the first hinge part 40.

The first hinge part 40 includes hinge holes (not shown) formed in the stand part 30 and the supporting bracket 31, and a hinge shaft 42 rotatably inserted in each of the hinge holes (not shown).

The first end of the stand part 30 is rotatably coupled to the supporting bracket 31 by the first hinge part 40, and a second end thereof is coupled to the base part 20 by the second hinge part 43.

The second hinge part 43 includes hinge protrusions 44 formed in the stand part 30, and protrusion holders 45 formed in the base part 20 adapted to rotatably receive the hinge protrusions 44. The hinge protrusions 44 may be provided in the base part 20, and the protrusion holders 45 may be provided in the stand part 30.

The base part 20 preferably has a substantially rectangular plate shape, and is mounted on the installation surface 2. The base part 20 is coupled to the stand part 30 with the locking assembly disposed therebetween. The base part 20 is capable of rotating between a supporting position (refer to FIG. 4) and a folding position (refer to FIG. 9). The supporting position is a position where the base part 20 is mounted substantially transverse to the stand part 30 by the second hinge part 43 and supports the display main body on the installation surface 2. The folding position is a position where the base part 20 is mounted substantially parallel to the first end of the stand part 30 and folded onto the rear surface of the display main body 10. The base part 20 is adapted to rotate between the supporting position and the folded/unfolded position, regardless of a position of the stand part 30.

The locking assembly, which prevents and allows the base part 20 from being and to be tilted between the supporting position and the folding position, includes projections 33 formed in the stand part 30. A coupling unit 50 is coupled to the base part 20 and is adapted to be removably coupled to the projections 33, thereby to preventing the base part 20 from being tilted and allowing the projections 33 to be uncoupled to allow the base part 20 to be rotated.

The coupling unit 50 includes casing parts 51 and 56 forming upper and lower covers and defining a space therebetween. A coupling part 60 is slidably disposed between the casing parts 51 and 56 and is adapted to be coupled to and uncoupled from the projections 33. Further, the coupling unit 50 includes a spring member 70 provided in the casing parts 51 and 56 that supplies an elastic force to the coupling part 60. An operating knob 63 (FIGS. 8a and 8b) is disposed in a lower side of the coupling part 60 to move the coupling part 60.

The upper cover 51 includes a cover part 52 and a base fastening part 54 extending from an end part of the cover part 52 and adapted to be fastened to the base part 20.

The cover part 52 has first fastening holes 53 adapted to be coupled to the lower cover 56. The base fastening part 54 has second fastening holes 55 adapted to be fastened by fasteners, such as screws (not shown), passing through inserting holes 23 of the base part 20.

The lower cover 56 includes a first guiding part 57 depressed in a middle area thereof that guides a supporting part 61 of the coupling part 60, and second guiding parts 72 depressed on both sides of the first guiding part 57 to guide projection holders 62 of the coupling part 60. Third fastening holes 71 formed in the lower cover 56 are adapted to be fastened by the fasteners, such as screws (not shown), inserted in the first fastening holes 53 of the upper cover 51.

The first guiding part 57 has a first through hole 58 passing through a plate of the lower cover 56. The second guiding part 72 has second through holes 59 passing through the plate of the lower cover 56 and adapted to be inserted in the projections 33 of the stand part 30. The first through hole 58 is disposed proximal through hole 21 formed in the base part 20. The operating knob 63 is exposed to a lower side of the base part 20 through the first through hole 58 and the base through hole 21. The second through holes 59 are disposed proximal through holes 22 formed in the base part 20.

The spring member 70 has a first end supporting the lower cover 56 and a second end supporting the coupling part 60. The spring member 70 supplies the elastic force in direction opposite a moving direction of the coupling part 60, which is moved by the operating knob 63.

The lower cover 56 may be integrally formed with the base part 20. Further, the coupling unit 50 may be provided in the stand part 30 and the projections 33 may be provided in the base part 20.

Hereinafter, a folding method of the display apparatus according to an exemplary embodiment of the present invention will be described.

As shown in FIGS. 1 and 4, the base part 20 is mounted on the installation surface 2 and supports the display main body 10 in the supporting position when the base part 10 is mounted in a direction substantially transverse to the first end of the supporting bracket 31. The projections 33 of the stand part 30 are inserted through the second through holes 59, and are coupled to the projection holders 62 provided in the coupling part 60 of the coupling unit 50, thereby preventing the base part 20 from being tilted.

Figure 5:
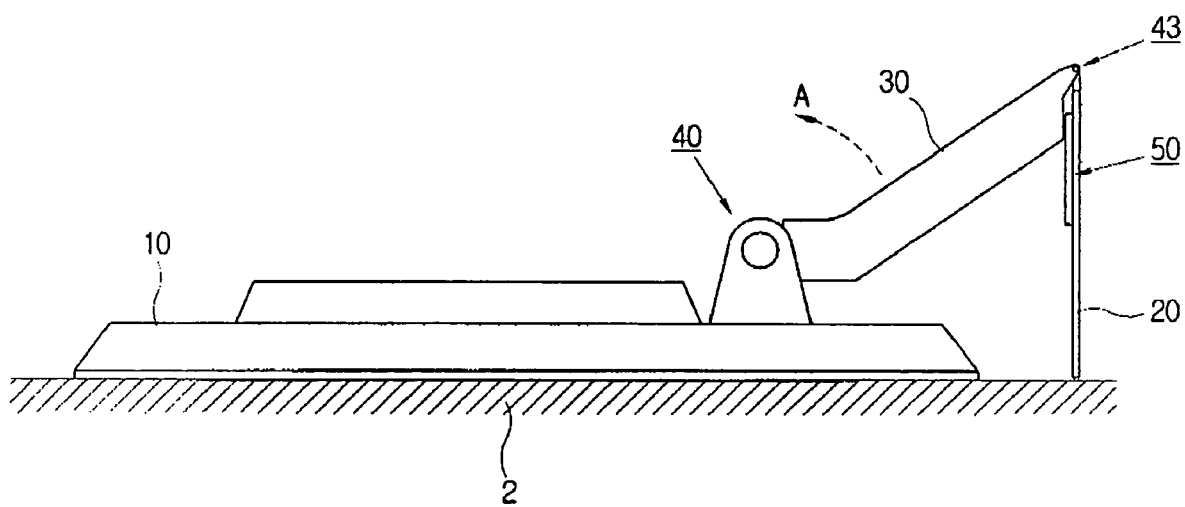
FIG. 5 is a side elevational view of a seated state of the display main body on the installation surface.
Figure 6:
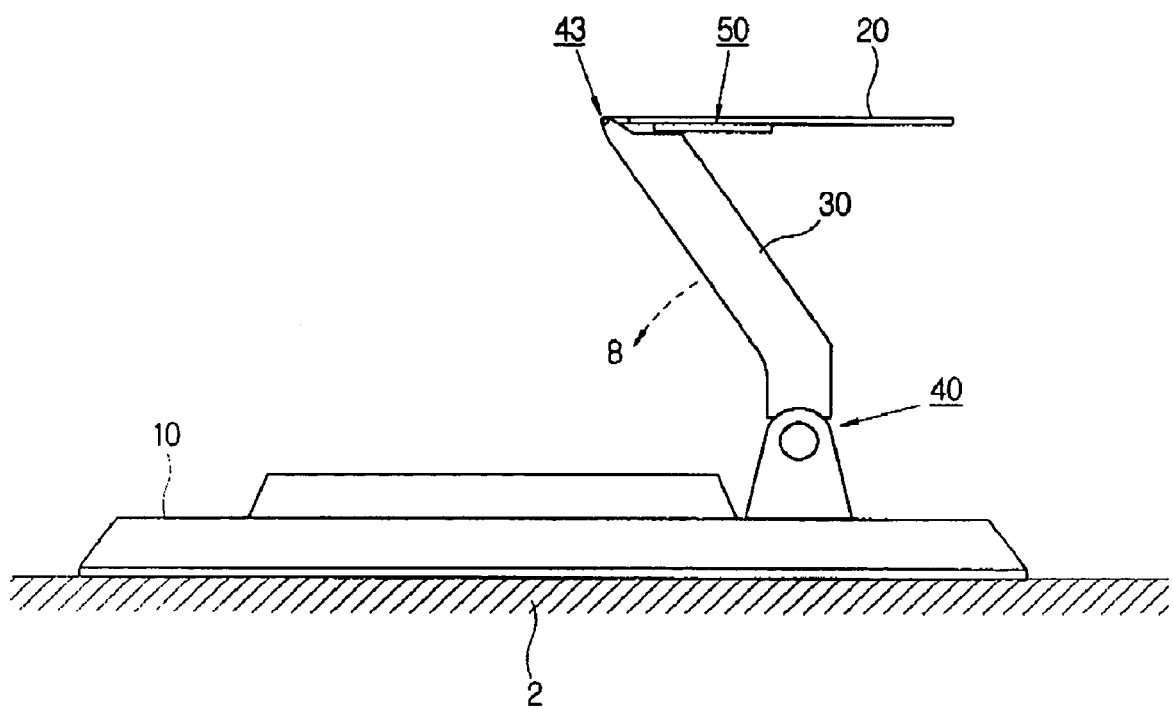
FIG. 6 is a side elevational view of the display apparatus in which the stand part is tilted with respect to the display main body in accordance with the exemplary embodiment of the present invention.
Figure 7:
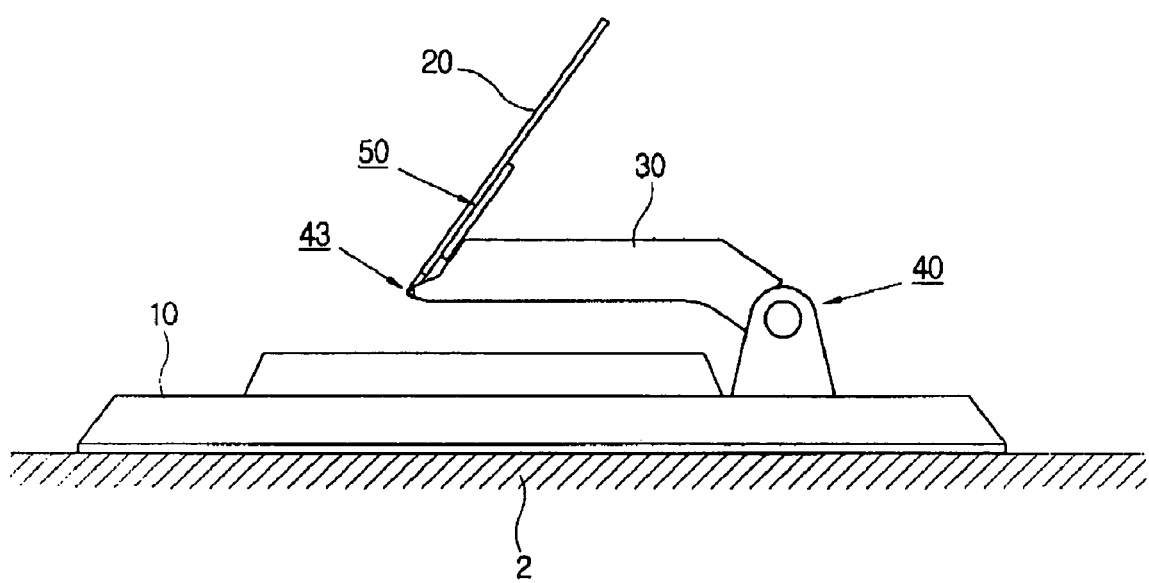
FIG. 7 is a side elevational view of the display apparatus in which the stand part is further tilted to be substantially parallel to the display main body in accordance with the exemplary embodiment of the present invention.

As shown in FIG. 5, the display main body 10 is mounted on the installation surface 2. When the stand part 30 is rotated in a direction indicated by the arrow A of FIG. 5 about the first hinge part 40, as shown in FIG. 6, the stand part 30 is positioned to be substantially upright with respect to the display main body 10. Further rotation of the stand part 30 in a direction indicated by arrow B of FIG. 6 about the first hinge part 40, results in the stand part 30 being folded to a position substantially parallel to the rear of the display main body 10.

Figure 8A:
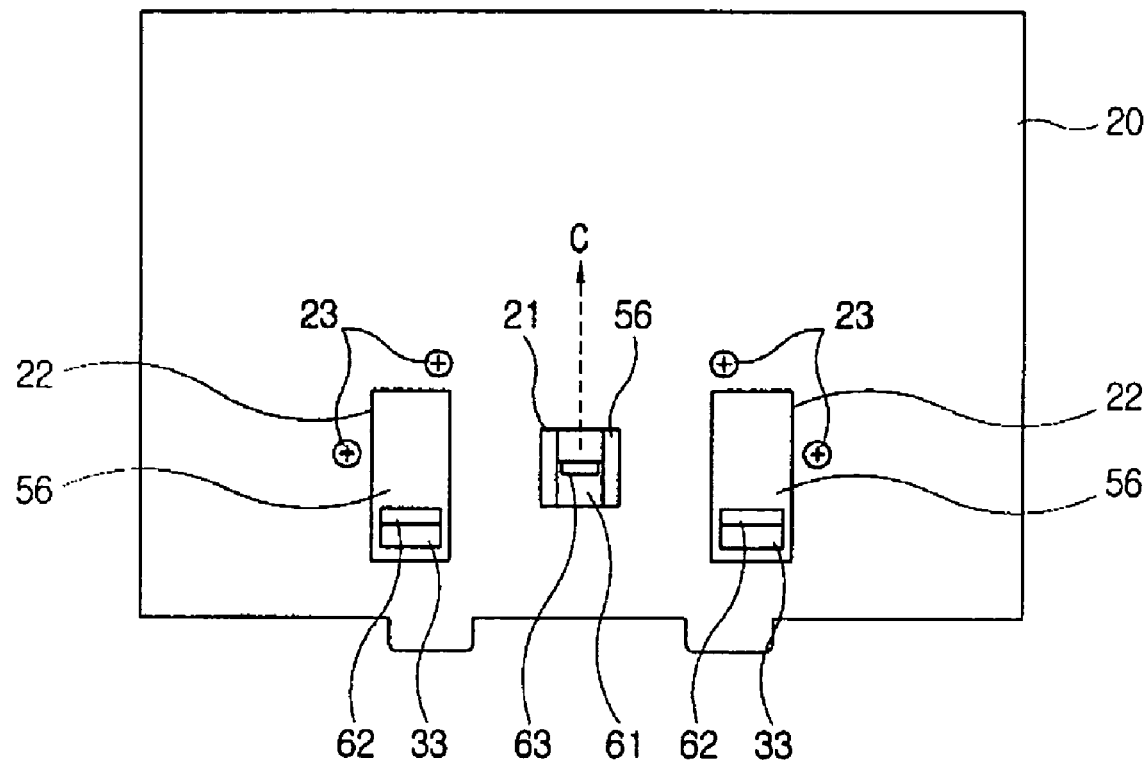
FIGS. 8a and 8b are bottom plan views of a locking assembly of the display apparatus in accordance with the exemplary embodiment of the present invention.
Figure 8B:
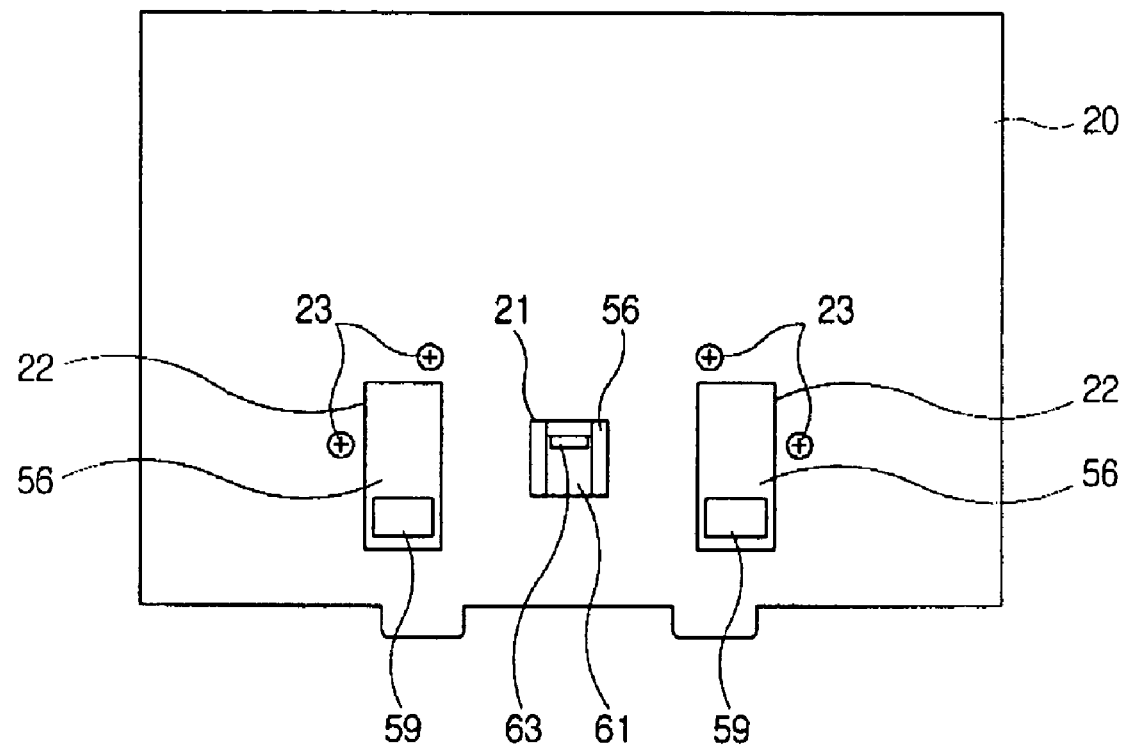

When the projections 33 are coupled to the projection holders 62 of the coupling part 60, as shown in FIG. 8a, a user holds the operating knob 63 exposed to the lower side of the base part 20 to move the coupling part 60 in a direction indicated by the arrow C. As shown in FIG. 8b, the projections 33 of the stand part 30 are uncoupled from the projection holders 62 of the coupling part 60 coupled in the base part 20, such that the base part 20 is rotated about the stand part 30.

Figure 9:
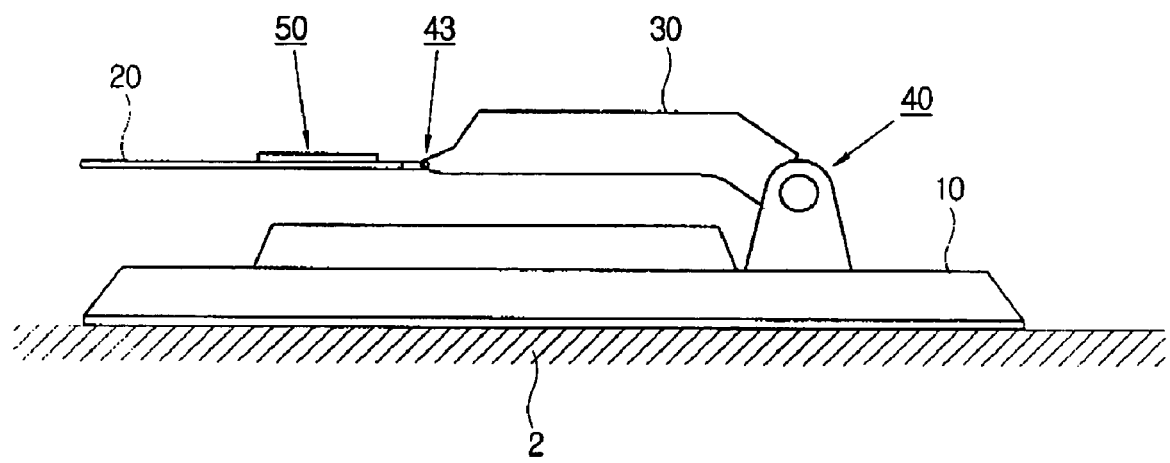
FIG. 9 is a side elevational view of a the stand part and the base part rotated onto the rear surface of the display main body in accordance with the exemplary embodiment of the present invention.

As shown in FIG. 9, when the base part 20 is rotated about the second hinge part 43, the base part 20 as well as the stand part 30 are positioned substantially parallel to the rear of the display main body 10. The user may transfer the display apparatus in such a packing state.

As described above, in the display apparatus according to an exemplary embodiment of the present invention, the user does not separate the base part 20 from the stand part 30, and may simply rotate the base part 20 about the second hinge part 43 with use of the locking assembly such that the base part 20 as well as the stand part 30 may be packed in the state when positioned substantially parallel with respect to the rear of the display main body 10. Therefore, the packing volume may be reduced. Furthermore, when the display apparatus is packed, the base part 20 is simply rotated without being separated from the stand part 30, such that the base part 20 and the stand part 30 are not lost.

While the invention has been shown and described with reference to certain embodiments thereof, it will be understood by those skilled in the art that various changes in form and details may be made therein without departing from the spirit and scope of the invention as defined by the appended claims.

What is claimed is:

1. A display apparatus having a display main body adapted to display an image, a base part adapted to be mounted on an installation surface and supporting the display main body, and a stand part provided between the base part and the display main body, comprising:

a first hinge part disposed between the display main body and the stand part and adapted to rotate the stand part proximal a rear surface of the display main body;

a second hinge part disposed between the stand part and the base part, and adapted to rotate the base part between a supporting position where the base part is substantially perpendicular to the rear surface of the display main body and a folding position where the base part is substantially parallel to the rear surface of the display main body; and a locking assembly that prevents and allows the base part from being and to be rotated between the supporting position and the folding position, the locking assembly including a projection connected to one of the stand part and the base part; and a coupling unit connected to the other one of the stand part and the base part and adapted to couple to the projection to prevent the base part from being rotated, and adapted to uncouple the projection to allow the base part to be rotated, the coupling unit including a casing part having a first side thereof adapted to couple to the stand part and a second side thereof adapted to couple to the base part; and a coupling part slidably coupled in the casing part, and adapted to couple to the projection and adapted to uncouple from the projection.

2. The display apparatus according to claim 1, wherein a spring member has a first end connected to the casing part and a second end connected to the coupling part to supply an elastic force to the coupling part.

3. The display apparatus according to claim 2, wherein an operating knob is connected to the coupling part to slide the coupling part within the casing unit.

4. The display apparatus according to claim 1, wherein an operating knob is connected to the coupling part to slide the coupling part within the casing unit.

5. The display apparatus according to claim 1, wherein the second hinge part includes a hinge protrusion connected to one of the stand part and the base part, and a protrusion holder connected to the other one of the stand part and the base part, the protrusion holder adapted to rotatably receive the hinge protrusion.

6. The display apparatus according to claim 3, wherein the operating knob extends through an opening in the base part.

7. The display apparatus according to claim 2, wherein the elastic force biases the coupling part to retain the projection within the coupling unit.

8. A display apparatus, comprising:

a display main body adapted to display an image, and a support bracket connected to the display main body;

a base part adapted to be secured to a support;

a stand part having a first end rotatably coupled to the display main body and a second end rotatably coupled to the base part;

a support member secured proximal the first end of the stand part and adapted to be rotatably received by the support bracket;

a locking assembly connected to the base part adapted to receive a projection connected to the stand part to prevent rotation of the base part; and a coupling part slidably coupled to the locking assembly adapted to secure the projection within the locking assembly;

wherein the base part is adapted to rotate between a first position substantially perpendicular to a rear surface of the display main body and a second position substantially parallel to the rear surface of the display main body; and the stand part is adapted to rotate between a first position and a second position proximal the rear surface of the display main body, the stand part being substantially parallel to the rear surface of the display main body in the second position.

9. The display apparatus according to claim 8, wherein a spring member has a first end connected to the locking assembly and a second end connected to the coupling part, the spring member biasing the coupling part in a first position to secure the projection within the locking assembly.

10. The display apparatus according to claim 9, wherein an operating knob is connected to the coupling part to slide the coupling part.

11. The display apparatus according to claim 10, wherein the spring member biases the coupling part in the first position to secure the projection within the opening in the locking assembly, and the operating knob slides the coupling part to a second position to remove the projection from the locking assembly.

12. The display apparatus according to claim 11, wherein the locking assembly has an upper cover secured to the base part, and a lower cover secured to the upper cover.

13. The display apparatus according to claim 12, wherein the operating knob is accessible through a first opening in the lower cover of the locking assembly and through a second opening in the base part.

14. The display apparatus according to claim 12, wherein the first end of the spring member is connected to the lower cover of the locking assembly and the second end of the spring member is connected to the coupling part.

* * * * *